United States Patent [19]

Clark et al.

[11] 4,432,404
[45] Feb. 21, 1984

[54] ICE AXE

[75] Inventors: James R. Clark, Kirkland; Michael K. Reeves, Redmond, both of Wash.

[73] Assignee: Seattle Manufacturing Corporation, Bellevue, Wash.

[21] Appl. No.: 364,983

[22] Filed: Apr. 2, 1982

[51] Int. Cl.³ .............................................. B26B 23/00
[52] U.S. Cl. .................................... 145/2 R; 145/29 B
[58] Field of Search .................. 145/2 R, 29 B, 29 R, 145/36

[56] References Cited

U.S. PATENT DOCUMENTS

| Re. 16,820 | 12/1927 | Estwing | 145/2 R |
|---|---|---|---|
| 2,656,225 | 10/1953 | Saylor | 145/29 B |
| 2,837,381 | 6/1958 | Sarlandt | 145/29 R |
| 2,917,349 | 12/1959 | Saylor et al. | 145/29 R |
| 3,753,602 | 8/1973 | Carmien | 145/29 R |
| 4,023,606 | 5/1977 | Kneissl | 145/2 R |
| 4,030,847 | 6/1977 | Carmien | 145/29 R |
| 4,367,969 | 1/1983 | Carmien | 145/29 R |

FOREIGN PATENT DOCUMENTS

| 628656 | 10/1961 | Canada | 145/29 R |
|---|---|---|---|
| 2330075 | 3/1974 | Fed. Rep. of Germany | 145/2 R |
| 691077 | 7/1930 | France | 145/29 R |

Primary Examiner—Frederick R. Schmidt
Assistant Examiner—S. T. Zatarga
Attorney, Agent, or Firm—Seed and Berry

[57] ABSTRACT

An ice axe or the like having an handle which is isolated from direct contact with the head of the axe. Isolation is obtained through use of a nonmetal spacer assembly which is positioned between the head and the handle to reduce vibration difficulties. At least one connector extends through an aperture in the head and connects directly to the handle. The spacer assembly isolates the connector from direct contact with the head during normal operation of the axe.

6 Claims, 5 Drawing Figures

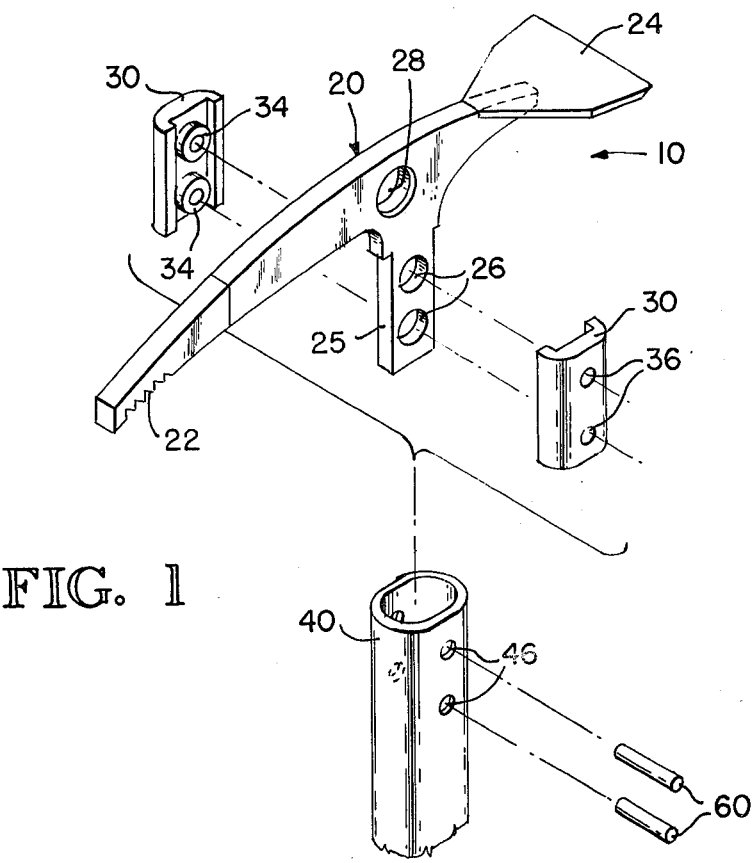
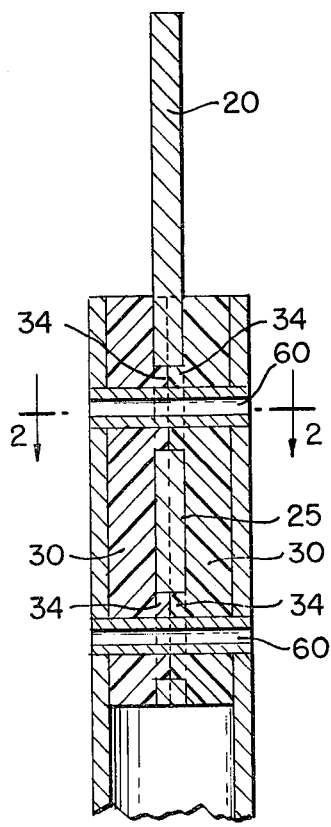
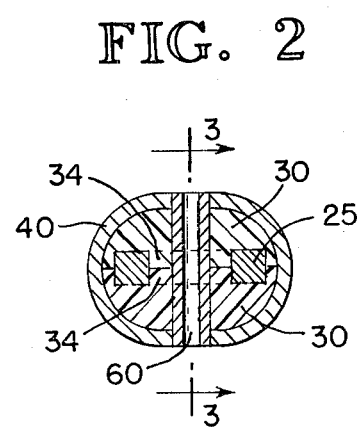
FIG. 1
FIG. 3
FIG. 2

ICE AXE

DESCRIPTION

1. Technical Field

This invention relates to climbing equipment, more particularly, to an ice axe or the like having an improved means for connecting the head of the ice axe to the handle.

2. Background Art

Until relatively recently, climbing ice required climbers to tediously hack a series of grooved steps into an icy slope and gradually ascend the resulting stairway. Consequently, ice formations were usually avoided by climbers when a suitable rock route was available. In the late 1950's, however, climbers in the ice gulleys of Northern Scotland became interested in ice climbing for its own sake.

Two types of climbing equipment which have been redesigned to facilitate ice climbing are crampons and ice axes. Crampons, which originally included a group of points projecting downwardly from the climber's boots, are now supplemented with a pair of points which project forwardly from the front of each boot. By properly kicking the tips of these front points into the inclined ice as little as 1.27 cm (0.5 inch), a climber can establish footholds on the ice without having to tediously form steps.

Conventional ice axes, known as alpine axes, are about 76.2 cm (30 inches) in overall length and are comprised of a head portion attached to a handle. The head portion includes a pick having a barbed tip at one end and an adz at the other. Ice axes designed for ice climbing are shorter and less cumbersome that conventional alpine axes. The pick of an ice climbing axe is generally more steeply sloped than that of an alpine axe. Ice climbing axes are designed to permit a climber to establish the equivalent of handholds by swinging a climbing axe toward the ice and planting the pick therein. With a climbing axe in each hand, a climber can ascend steeply inclined ice formations using the axe picks and front crampon points to remain secured to the ice.

A modification of the ice climbing axe, known as an "ice hammer," has also been designed for ice climbing. An ice hammer differs from an ice climbing axe in that one end of the head portion comprises a flat surface in place of an adz for hammering ice screws into the ice.

When an ice axe or ice hammer is used for ice climbing, placement of the pick within the ice is critical to the safety of the climber. A climber must judge the quality of pick placement based upon the sound made by the pick when it enters the ice and the feel of the axe or hammer as the pick is planted. The impact of the pick entering the ice will necessarily transmit vibrations into both the ice and the pick. If sufficient vibrations are transmitted to the ice when the pick is planted, a series of circular fraction lines will form in the ice, encircling the pick and potentially, causing the ice in which the pick is planted to shatter and break away from the main ice formation. This breaking away phenomena is called "dinner plating," due to the shape of the shattered ice formation.

The condition of the ice will affect the likelihood of dinner plating occurring. Cold, brittle ice may shatter readily. Ice without air bubbles is more susceptible to dinner plating, as bubbles in the ice will release the stress by breaking the fractured lines.

Originally, ice climbing axes had wooden handles. A wooden handle is advantageous in that it absorbs much of the vibration created when the pick is planted in the ice, thereby reducing the risk of dinner plating. Additionally, a wooden handled axe is well suited to allow a climber to judge the quality of pick placement based on feel and sound.

Unfortunately, wood is not ideally suited for the harsh treatment typically given to ice axes. In addition to exposure to moisture and temperatures as low as −40° C. (−40° F.), ice axes may be exposed to temperatures as high as 71.1° C. (160° F.) if left under a vehicle windshield. As wood is a nonuniform material and may have hidden defects, it is therefore susceptible to cracking due to expansion and contraction as well as moisture rotting when used in an ice axe handle. These potential problems with wood handles have led many ice climbers to consider them unsafe.

Thus, despite the advantageous vibration-absorbing qualities of wood and its ability to allow climbers to judge the quality of pick placement based on sound and feel, safety considerations have led to the use of metal handles.

Metal is a preferred material for ice axe handles because of its structural integrity. It is a homogeneous material and it is stronger than wood. Metal handles are generally better able to withstand the wide range of climatic exposure received by ice axes. Consequently, ice climbing axes having metal handles connected directly to a metal head portion, such as that disclosed in West German Pat. No. 2,330,075, have become increasingly popular.

Although metal-handled ice climbing axes eliminate the strength and durability problems which result from wooden handled ice climbing axes, until now they have created new problems of their own. While wooden handled ice climbing axes are able to absorb some of the vibrations resulting from the impact which results when the pick is planted in the ice, metal-handled ice climbing axes transmit these vibrations directly to the climber. This direct transfer creates two problems. First, secondary vibrations are directed back to the head portion of the ice climbing axes, resulting in increased ice fracturing and increased liklihood of dinner plating. Second, as the climber must absorb more impact shock, it becomes more difficult to feel the quality of the pick placement. The climber will also tire more easily from absorbing the additional shock. Additionally, the metal-handled ice climbing axes distort the sound associated with the placement of the pick and make it more difficult for a climber to hear when the ice axe has been properly placed in the ice.

It can be seen, therefore, that there is a need for an ice axe design which has the integrity and safety characteristics of a metal-handled ice climbing axe yet still provides the advantages to a climber present in the wooden handled ice climbing axes. Although the use of an elastic material encircling the upper end of a handle for a hammer or axe such as that disclosed in U.S. Pat. No. 222,825 is known, such an arrangement is unacceptable for ice climbing purposes. Such a design is not well suited for the wide temperature range required in ice climbing axes and, further, lacks the structurally integrity and safety needed for such purposes.

DISCLOSURE OF INVENTION

It is an object of this invention to provide an ice climbing axe having the structural strength and safety characteristics of a metal-handled axe as well as the vibration-absorbing characteristics of a wood-handled axe.

It is another object of this invention to provide an ice climbing axe having a connection between the head portion and the handle which remains secure over the range of operating temperatures and conditions of an ice climbing axe.

It is another object of this invention to provide such a connection which will additionally prevent dirct transmission of vibrations from the head portion of the axe to the handle of the axe.

It is an object of this invention to provide an ice climbing axe wherein there is no direct contact between the head and the handle of the ice axe.

These and other objects of the invention, which will become more apparent as the invention is fully described below, are obtained by providing an ice axe, ice hammer or the like having a novel connection between the head and the handle of the axe. The head is isolated from direct contact with the handle by means of a nonmetal spacer assembly positioned therebetween to absorb vibrations. At least one metal pin is connected directly to the handle and extends through an aperture in the head. The pin is isolated from direct contact with the head by the spacer assembly, thereby creating a connection which will absorb vibrations yet provide the integrity of a metal-to-metal connection in the event of a failure of the spacer assembly material.

The head of the axe is provided with a shank which depends therefrom and includes at least one aperture extending therethrough. A spacer assembly fits snugly around the shank and surrounds the shank aperture without obstructing access to it. A handle, preferably of metal construction with a synthetic outer liner, includes a hollow upper region having inside dimensions sized to fit snugly over the spacer assembly. Apertures are provided on opposite sides of the handle at locations corresponding to the location of the shank aperture. When the shank and spacer assembly are inserted within the hollow region of the handle, a metal pin, sized to fit snugly through the aligned handle and shank apertures, secures the head, spacer assembly and handle in place.

BRIEF DESCRIPTION OF THE DRAWINGS

FIG. 1 is an exploded view of one preferred embodiment of the invention, with the bottom portion of the axe handle cut away.

FIG. 2 is a cross-sectional view of the ice axe of FIG. 1 taken horizontally through the handle of the ice axe through the center of the uppermost pin, as indicated by line 2—2 of FIG. 3.

FIG. 3 is a cross-sectional view taken through line 3—3 of FIG. 2.

BEST MODE FOR CARRYING OUT THE INVENTION

Figure 4:
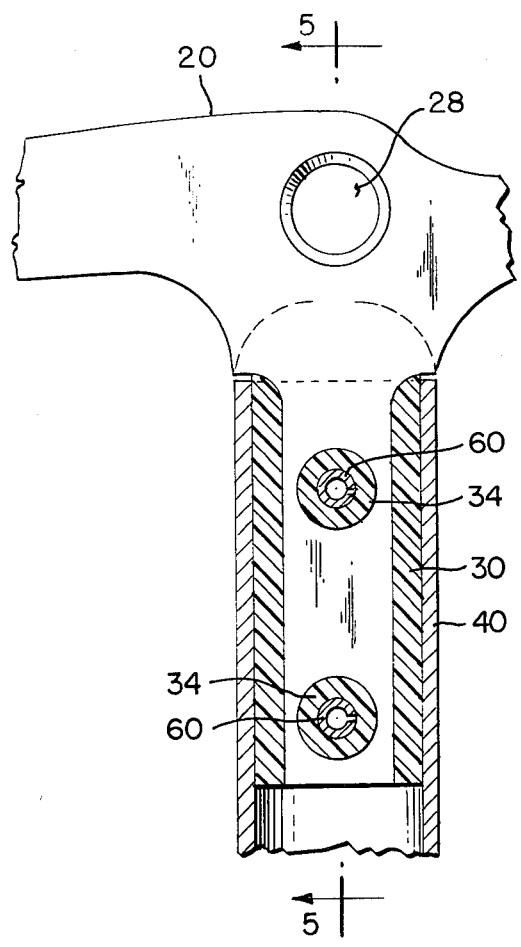
FIG. 4 is a cross-sectional view of a second preferred embodiment of the invention taken vertically along one edge of the shank of the head portion, as indicated by line 4—4 in FIG. 5.

An ice climbing axe 10 embodying the present invention is shown in FIG. 1. The axe 10 is comprised of a head 20, a pair of spacers 30 which fit around the lower portion of the head 20, a handle 40 which fits snugly around the outside of the two spacers, and a pair of pins 60 which hold these elements in place.

The upper portion of the head 20 includes a pick 22 at one end and an adz 24 on the other end. An aperture 28 is located in the upper portion of the head 20, between the pick 22 and the adz 24, to permit a rope or carabiner to be passed through the axe. Depending from the upper portion of the head 20 is a shank 25. The shank 25 is essentially a rectangular solid having a pair of shank apertures 26 extending therethrough.

A spacer assembly comprised of a pair of spacers 30 surrounds the shank 25 of the head 20. The interior surfaces of the spacers 30 are shaped to conform to the exterior surface of the shank 25. Cylindrical projections 34 extend from the interior surface of each spacer 30 at locations corresponding to the shank apertures 26 to encircle the interior surfaces of the shank apertures 26. A pair of spacer apertures 36 extend inwardly from the exterior surface of each spacer 30 through the center of each cylindrical projection 34. When in an assembled position, the cylindrical projections 34 of each spacer 30 preferably abut one another such that the spacer assembly completely surrounds the shank apertures 26, leaving spacer apertures 36 passing therethrough.

A hollow handle 40, preferably having an elliptical cross-section, is sized to fit snugly around the assembled head 20 and spacers 30 combination, as seen in FIGS. 2 and 3. Handle apertures 46 extend through the handle walls at locations corresponding to the spacer apertures 36 of each spacer 30. The handle apertures 46 and spacer apertures 36 are preferably of uniform size so as to permit pins 60 to extend therethrough to secure the assembly in place.

The head 20, handle 40, and pins 60 are preferably of metal composition. The pins 60, as illustrated in FIGS. 1-5, are hollow stainless steel pins having a seam down the center. Although the embodiments of the ice axe illustrated in FIGS. 1 through 5 illustrate a handle of metal construction only, the handle preferably also includes a liner of synthetic material which surrounds the exterior of the handle. This liner serves to isolate the user from direct contact with the metal and to further absorb vibrations in the axe.

As seen in FIG. 3, the spacers 30 completely isolate the head 20 from contact with the handle 40 or the pins 60. The spacers 30 are composed of a nonmetallic material, such as ultra-high molecular weight polypropylene, which is not brittle at low temperatures and, additionally, maintains a high impact strength at low temperatures. It is also important that the spacer material maintain relatively uniform dimensions over the range of operating temperatures of an ice climbing axe so that a tight fit will be maintained at all times.

Although the spacer assembly is illustrated in FIGS. 1-5 as comprising a pair of spacers 30, it will be clear to those of ordinary skill in the art that other arrangements of spacer pieces could be combined to form a spacer assembly performing the same function as the spacers 30 illustrated herein. For example, spacers similar to those illustrated in FIG. 1 could be provided wherein the spacer apertures were of the same size as the shank apertures 26. The cylindrical projections 34 of each spacer would be omitted. In place of each pair of cylindrical projections, a hollow cylindrical spacer member, comprised of the same material as the spacer, could be inserted through the enlarged spacer whole to isolate each pin 60 from the shank 25. Thus, under such an arrangement, the spacer assembly would be comprised of two individual spacers, each having a pair of enlarged spacer apertures, and a pair of hollow cylindrical spacers extending through each spacer aperture and the shank aperture. It can be seen, therefore, that the number of pieces making up the spacer assembly is inconsequential to the functioning of the present invention. It is important only that the spacer assembly isolate the shank 25 of the head 20 from direct contact with the handle 40 or the pins 60 during ordinary use. Additionally, it is important that the spacer assembly provide a tight connection between the shank 25 and the handle 40. The spacer configurations illustrated in FIG. 1 through FIG. 5 have been chosen for ease in molding when using ultra-high molecular weight polyethylene.

Figure 5:
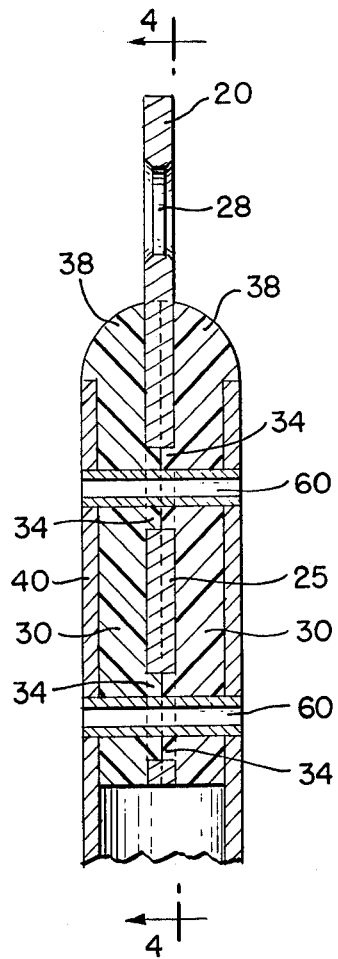
FIG. 5 is a cross-sectional view taken through line 5—5 of FIG. 4.

An alternate preferred embodiment of the invention is disclosed in FIGS. 4 and 5. The spacer assembly of this embodiment includes a fairing 38 on each spacer 30 which extends upward above the top of the handle 40 to meet the head 20. Referring to FIG. 4, it can be seen that the top of the handle 40 preferably does not come in direct contact with the head 20.

Although two preferred embodiments of the invention are disclosed herein, there are, of course, other modifications which could be made without departing from the spirit of this invention. For example, although the embodiments disclosed herein utilize two shank apertures 26 and two pins 60, a single pin and shank aperture would also be functional. Similarly, the shape of the shank 25 or the handle 40 could be modified without departing from the spirit of this invention. It is also readily apparent that only the portion of the handle which encloses the shank need be hollow. This invention is not limited to ice climbing axes. It applies equally to ice climbing hammers and other hand tools having similar design requirements. Other modifications will be apparent to those of ordinary skill in the art, and it is not intended to limit the invention to the specific embodiments diclosed herein.

We claim:

1. An ice axe which comprises:
   a head having an upper portion including a tool, and a shank depending from the upper portion, the shank including an aperture extending therethrough;
   a nonmetallic spacer which surrounds the shank and abuts the exterior surfaces of the shank and shank aperture, the interior surfaces of the spacer being shaped to conform to the exterior surfaces of the shank and shank aperture, the spacer forming an elongated passageway which extends through the spacer and shank aperture;
   a handle having a hollow upper portion which surrounds the shank and spacer, the interior surfaces of the hollow upper portion being shaped to conform to the exterior surfaces of the spacer assembly such that the interior surfaces of the handle abut the exterior surfaces of the spacer, the handle having handle apertures aligned with each end of the spacer passageway; and
   a pin extending through the spacer passageway and handle apertures and being secured to the handle at each handle aperture, such that, in the event of failure of the spacer, the pin will engage the shank at the shank aperture to form a direct connection between the head and handle.

2. The ice axe of claim 1, further including second aligned shank, spacer and handle apertures and a pin positioned within said second apertures.

3. The ice axe of claim 1 wherein the shank is a rectangular solid depending from the upper portion of the head.

4. An ice axe having a head and handle, each made of metal, said head having a shank depending therefrom and an ice-penetrating point, and means coupling said head to said handle, said coupling means including a metal pin engaging the handle at two spaced apart locations on the perifery of the handle and extending through the shank, the coupling means additionally including spacer means separating the handle from the head and the pin from the shank, said spacer means being of a vibration dampening material to isolate the head and handle for giving good feel and sound characteristics while not diminishing ice placement quality, yet providing a metal-to-metal connection between the head, pin and handle should the spacer means fail.

5. An ice axe which comprises:
   a head having a shank depending therefrom, the shank including a shank aperture extending therethrough;
   a handle having a hollow upper portion which surrounds the shank;
   a pin extending through the handle and the shank aperture; and
   a nonmetallic spacer intermediate the shank and the upper portion of the handle, the spacer lining the shank aperture such that it is intermediate the shank and the pin during normal operation thereby isolating the head and the handle during normal use yet allowing direct contact between the pin and the shank should the spacer fail.

6. An ice axe according to claim 5, in which said spacer comprises a pair of matching check members collectively surrounding said shank and pin and presenting opposed hollow cylindrical projections separating the pin from the wall of the aperture.

* * * * *